A. E. KNOWLES.
APPARATUS FOR THE PURIFICATION OF ELECTROLYTIC GASES.
APPLICATION FILED OCT. 19, 1911.

1,067,822.

Patented July 22, 1913.

2 SHEETS—SHEET 1.

WITNESSES:
W. H. Berrigan
Alfred R. Anderson

INVENTOR
ALBERT EDGAR KNOWLES
by J. Van Oldenneel
Attorney.

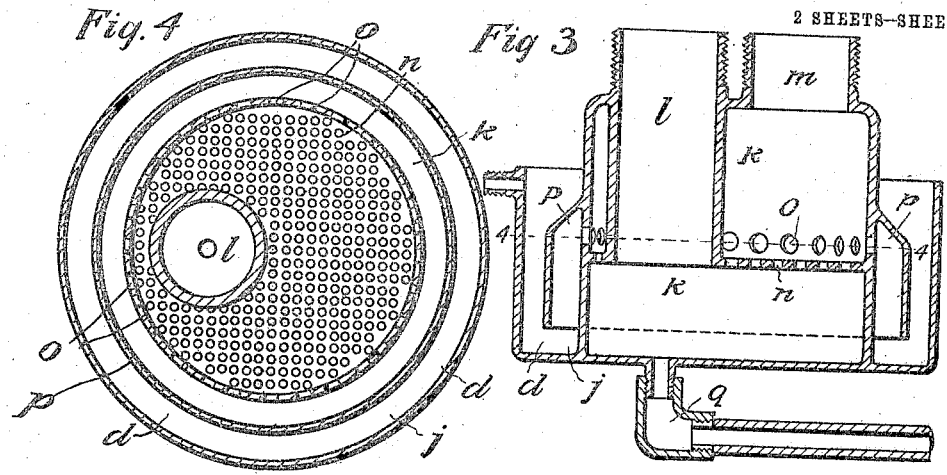

UNITED STATES PATENT OFFICE.

ALBERT EDGAR KNOWLES, OF WOLVERHAMPTON, ENGLAND.

APPARATUS FOR THE PURIFICATION OF ELECTROLYTIC GASES.

1,067,822.

Specification of Letters Patent. Patented July 22, 1913.

Application filed October 19, 1911. Serial No. 655,647.

*To all whom it may concern:*

Be it known that I, ALBERT EDGAR KNOWLES, a subject of the King of Great Britain, residing at 112 Tettenhall road, Wolverhampton, county of Stafford, England, have invented a new and useful Improvement in Apparatus for the Purificatiton of Electrolytic Gases; and I do hereby declare the following to be a full, clear, and exact description of the same.

This invention comprises improvements in apparatus for the purification of electrolytic gases and has for its object to enable gas of greater purity to be obtained and further to render working more economical.

The gas may be passed to the purifying apparatus from an ordinary washer following its production from water by electrolytic action. On its way to the purifier the gas may be passed through a suitable meter and is led to an explosion trap which will be hereafter more fully described and from that the gas passes to the heating chamber or the purifier proper. In its entry into this chamber the ingoing gas is preheated by the passage around the inlet pipe of the outgoing gas and vapor. The gas then passes through the contact material acting as a catalytic agent instead of over it and the gas and the water vapor, formed by the combination of the gas which is being collected and the one present as an impurity, pass out to a second trap where the vapor condenses and is removed, being utilized for making up the liquid seal of the first explosion trap. From this second explosion trap the purified gas passes away through an outlet pipe to a suitable collector. This purifier is used on each half of the electrolytic plant so that in one case the gas collected is hydrogen with oxygen to be dealt with as an impurity and in the other case oxygen is collected and hydrogen is dealt with as an impurity.

Figure 1:
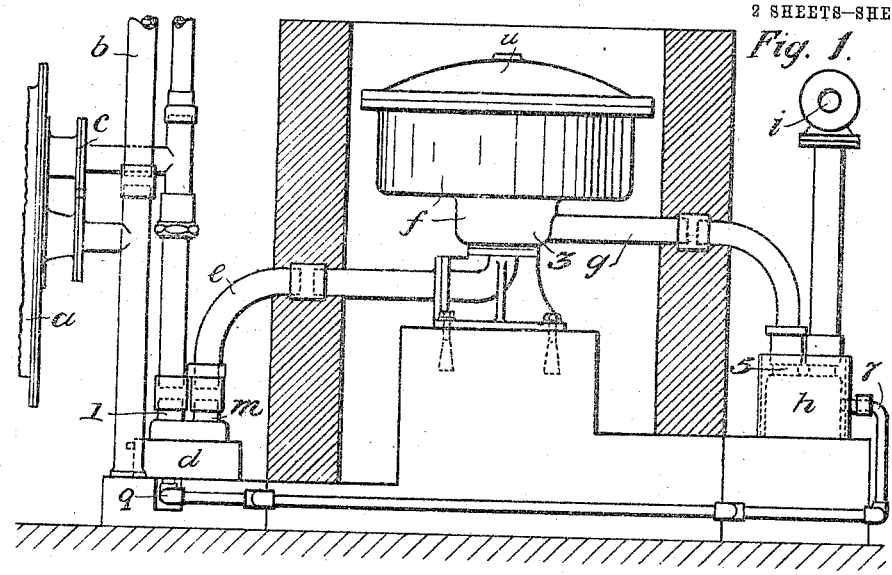
Figure 2:
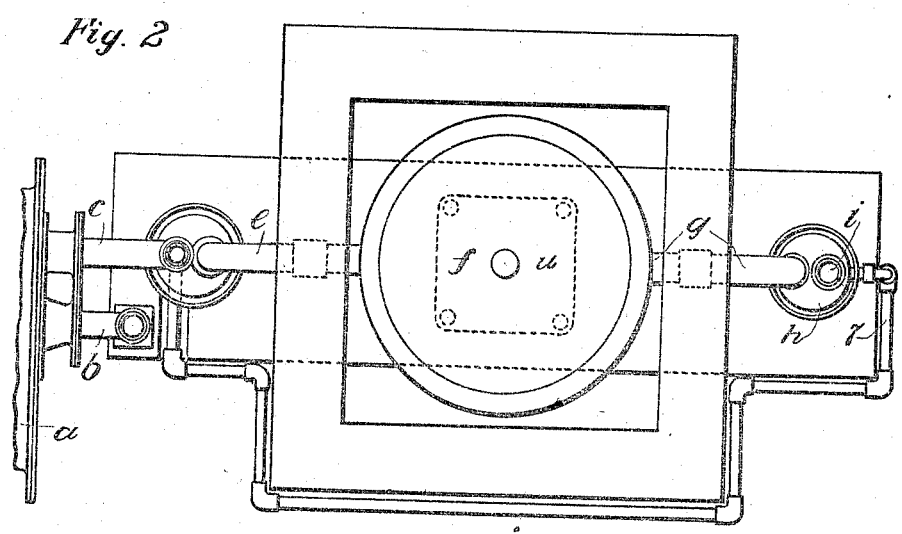
Figure 5:
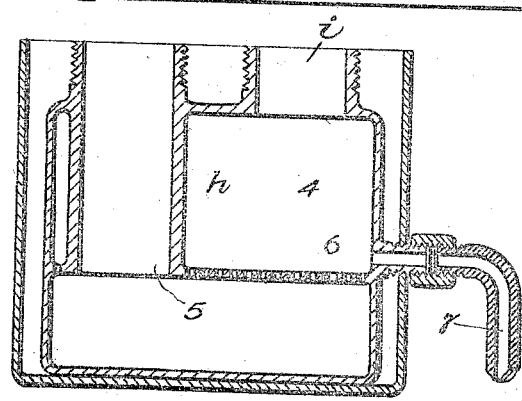

On the drawings: Figure 1. is a general view of the apparatus. Fig. 2. a plan. Fig. 3. is a section of the first explosion trap. Fig. 4. is a sectional plan on line 4—4 of Fig. 3. Fig. 5. is a sectional view of the second trap.

In the general view of the apparatus, Fig. 1, a meter is shown at $a$ and may be embodied in plants when desired. The lead from the ordinary washer is shown at $b$ and the outlet from the meter at $c$. $d$ is the first explosion trap, $e$ the lead to the purifier, $f$ is the purifier, $g$ the outlet, $h$ the second explosion trap and $i$ the outlet.

When a meter $a$ is used it may be of any approved form. The connections to and from the meter are also of any suitable form. The explosion trap $d$, Figs. 3 and 4 comprises an outer vessel $j$ with an inner vessel $k$ with a gas inlet $l$ and outlet $m$. The gas inlet $l$ is carried some distance into the inner vessel and around its orifice a perforated diaphragm $n$ is secured in the vessel. The gas outlet $m$ is preferably taken from the top of the vessel $k$ leaving a good space in the vessel between the inlet pipe and the outlet pipe. Clear above the diaphragm $n$ I arrange a series of holes $o$ in the wall of the vessel $k$ communicating with an envelop or bell $p$ around the vessel and from below the envelop with the outer vessel $j$. This vessel $k$ is supplied with liquid through a suitable connection such as $q$ and the liquid rises through the perforated diaphragm $n$ and seals the orifice of the inlet pipe $l$ overflowing through the holes $o$ to the bell $p$ and outer vessel $j$ where it forms a jacket for the inner vessel; $r$ is an overflow from the outer vessel. The holes $o$ form the easiest outlet for any extraordinary back pressure in the outlet pipe $m$ and through these holes and the liquid in the outer vessel such pressure is dissipated before the seal of the inlet orifice is overcome so that a secure explosion trap is provided.

The trap or seal $h$ comprises an inner chamber 4 with a perforated diaphragm therein corresponding with the level of the bottom of the gas inlet 5. See Fig. 5. The outlet 6 to the pipe 7 is well above the bottom of the inlet 5 and the water of condensation collects in the chamber and rises through the diaphragm to the level of this outlet forming the seal for the inlet 5. The gas outlet is taken from the top of the chamber 4 and the whole trap is inclosed in an outer vessel in which liquid is maintained to form a cooling jacket.

The water vapor which is condensed and collected in $h$ maintains a seal therein and then overflows at 6 to a pipe 7 which is connected up with the trap $d$, (see Figs. 1 and 2) where it makes up the seal for the gas inlet and also makes up a cooling jacket around the trap.

What I claim then is:

1. An apparatus for the purification of electrolytic gases comprising a purifying chamber and suitable supply and delivery means, an explosion trap, said trap being arranged between the gas supply and the purifier, a second trap arranged beyond said purifier and means whereby the first trap is sealed by the condensation water collected in said second trap, substantially as described.

2. An apparatus for the purification of electrolytic gases comprising in combination a purifier with an explosion trap on the inlet side having a sealed inlet, and a trap on the outlet side, a communication from the second of said traps to the first so that condensation water overflows from the second trap to make up said liquid seal in the first.

3. An apparatus for the purification of electrolytic gases, comprising a gas supply, a purifier, a gas outlet, a trap between the purifier and the gas supply, and a trap beyond said purifier, the first trap having means between the connection to the gas supply and its connection to the purifier for dissipating back pressure in the latter connection and having a liquid for its connection to the gas supply and the second trap having means for collecting the condensed water vapor caused by the combination of the gases in the said purifier and means leading from said second trap to said first trap so that the condensation water is conveyed to the first trap and utilized for making up the liquid seal therein.

4. For gas apparatus an improved explosion trap having inner and outer vessels, an inlet carried into the inner vessel and a gas outlet therefrom and means such as a series of holes clear above the orifice of the said gas inlet forming a release for gas pressure, the said inner vessel further having a liquid seal and said outer vessel being supplied with liquid so that it constitutes a liquid jacket for the said inner vessel, substantially as described.

In testimony whereof I affix my signature in presence of two witnesses.

ALBERT EDGAR KNOWLES.

Witnesses:
F. G. BRETTELL,
WM. H. BERRIGAN.

---

Copies of this patent may be obtained for five cents each, by addressing the "Commissioner of Patents, Washington, D. C."